United States Patent
Hamdi et al.

(10) Patent No.: US 10,089,664 B2
(45) Date of Patent: Oct. 2, 2018

(54) INCREASING RELIABILITY OF INFORMATION AVAILABLE TO PARTIES IN MARKET TRANSACTIONS

(71) Applicant: Equifax, Inc., Atlanta, GA (US)

(72) Inventors: Naser Hamdi, Chesterfield, MO (US); Eric Bloomquist, Richmond Heights, MO (US); William Esterhuizen, Pittsboro, NC (US); Sterling Metz, Cumming, GA (US)

(73) Assignee: Equifax Inc., Atlanta, GA (US)

(*) Notice: Subject to any disclaimer, the term of this patent is extended or adjusted under 35 U.S.C. 154(b) by 992 days.

(21) Appl. No.: 14/271,690

(22) Filed: May 7, 2014

(65) Prior Publication Data

US 2014/0337170 A1 Nov. 13, 2014

Related U.S. Application Data

(60) Provisional application No. 61/820,450, filed on May 7, 2013.

(51) Int. Cl.
*G06Q 30/00* (2012.01)
*G06Q 30/06* (2012.01)

(52) U.S. Cl.
CPC .................. *G06Q 30/0609* (2013.01)

(58) Field of Classification Search
CPC ............ G06Q 30/00; G06Q 30/0601; G06Q 30/0631; G06Q 40/02; G06Q 40/06
See application file for complete search history.

(56) References Cited

U.S. PATENT DOCUMENTS 6,058,377 A * 5/2000 Traub ............... G06Q 40/00 705/35
6,385,594 B1 5/2002 Lebda et al.
(Continued)

FOREIGN PATENT DOCUMENTS

JP 2003532227 10/2003
KR 1020040054026 6/2004
(Continued)

OTHER PUBLICATIONS

Cho, Chang-Hoan, and University of Texas at Austin) is an as-. "Why do people avoid advertising on the internet?." Journal of advertising 33.4 (2004): 89-97. (Year: 2004).*
(Continued)

*Primary Examiner* — Michael Misiaszek
*Assistant Examiner* — Christopher B Seibert
(74) *Attorney, Agent, or Firm* — Kilpatrick Townsend & Stockton LLP

(57) ABSTRACT

Aspects and examples are disclosed for facilitating and signaling market transactions between providers of products or services and clients that consume or otherwise use the products and services. In one example, a processing device of a server system receives, via a data network, data from a computing system describing attributes of a client that uses the computing system. The processing device can verify at least some of the received data to generate a client profile for the client. Based on verifying the data in the client profile, the processing device can notify one or more providers of a product or service that the client is interested in the product or service. Notifications to providers of the product or service can maintain the anonymity of the client. Notifications to the providers can also identify a client type, the client's propensity to purchase or access certain products or services, etc.

20 Claims, 7 Drawing Sheets

(56) References Cited

U.S. PATENT DOCUMENTS

| | | | |
|---|---|---|---|
| 7,620,595 B1* | 11/2009 | Holt | G06Q 40/02 |
| | | | 700/99 |
| 7,720,750 B2 | 5/2010 | Brody et al. | |
| 8,214,262 B1 | 7/2012 | Semprevivo et al. | |
| 2004/0073477 A1* | 4/2004 | Heyns | G06Q 10/0637 |
| | | | 705/7.31 |
| 2008/0033869 A1* | 2/2008 | Steele | G06Q 20/10 |
| | | | 705/38 |
| 2008/0097867 A1* | 4/2008 | Engle | G06Q 30/02 |
| | | | 705/26.7 |
| 2009/0055327 A1* | 2/2009 | Jones | G06Q 40/00 |
| | | | 705/36 R |
| 2009/0276368 A1* | 11/2009 | Martin | G06Q 40/02 |
| | | | 705/36 R |
| 2010/0100470 A1* | 4/2010 | Buchanan | G06Q 10/10 |
| | | | 705/35 |
| 2010/0114624 A1* | 5/2010 | Lakshminarayan | G06Q 40/00 |
| | | | 705/35 |
| 2010/0145788 A1* | 6/2010 | Kardokas | G06Q 20/102 |
| | | | 705/14.34 |
| 2011/0087985 A1* | 4/2011 | Buchanan | G06F 3/04847 |
| | | | 715/771 |
| 2011/0137818 A1 | 6/2011 | Goad et al. | |
| 2014/0019217 A1* | 1/2014 | Eliscu | G06Q 30/02 |
| | | | 705/14.1 |

FOREIGN PATENT DOCUMENTS

| WO | 2012042382 | 4/2012 |
|---|---|---|
| WO | 2012177382 | 12/2012 |

OTHER PUBLICATIONS

International Application No. PCT/US2014/037062, International Search Report and Written Opinion dated Sep. 22, 2014, 12 pages.
European Patent Application No. 14795043.0, Extended European Search Report; dated Oct. 21, 2016, 5 pages.

* cited by examiner

INCREASING RELIABILITY OF INFORMATION AVAILABLE TO PARTIES IN MARKET TRANSACTIONS

CROSS-REFERENCE TO RELATED APPLICATIONS

This disclosure claims priority to U.S. Provisional Application Ser. No. 61/820,450 filed May 7, 2013 and titled "Networked Facilitation of Market Transparency and Credibly Signaling Market Participant Type," the contents of which are hereby incorporated by reference.

TECHNICAL FIELD

This disclosure relates generally to computer hardware and methods implemented on such computer hardware, and more particularly to increasing the amount and reliability of information available to parties in market transactions.

BACKGROUND

Market transactions involve exchanges of products and services among different parties. In market transactions, information asymmetry can involve one party to a transaction having more information (or more reliable information) than another party. This information asymmetry may result in or otherwise contribute to an imbalance of power in market transactions. This imbalance of power may reduce the value of these transactions to one or more parties, may reduce the likelihood of one or more parties entering into a transaction, or may otherwise result in or contribute to market failure.

An absence of reliable information for market transactions may negatively impact consumers. For example, credit bureaus may mitigate the risk of adverse selection in the financing industry by allowing lenders (i.e., sellers) to "screen" borrowers (i.e., buyers) through a credit score or report. However, such screening operations may rely on incomplete or inaccurate risk models that prevent a consumer from purchasing a product or service, even if the consumer is actually financially able to do so. An absence of reliable information may also negatively impact marketing efforts by providers of products and services. For example, providers may not know which consumers are financially capable of purchasing a given product or service or know which consumers are interested in a given product or service.

Prior solutions for improving the information available to providers may involve screening a consumer after the consumer has initiated a prospective transaction with the provider of a product or service (e.g, lenders, insurers, sellers of commercial products, etc.). For example, the consumer may represents himself or herself in a certain way to a seller. If the seller decides that this individual might qualify for the seller's products and services, the seller may attempt to screen the applicant by verifying the applicant's information through third parties, such as credit bureaus and other credit reporting agencies. The third party may attempt to screen the consumer based on the consumer's credit score, income, employment, or other data. In these prior solutions, the consumer may have little to no awareness of what data is being used to decide whether the seller will enter into a transaction with the consumer. Furthermore, these prior solutions may not allow a seller to prospectively screen out high-risk consumers or other undesirable consumer until the seller and consumer have both expended substantial resources to reach the transaction stage and the consumer has provided information for the seller to verify.

It is desirable for sellers of products and services to have access to reliable information about prospective consumers or clients. It is also desirable for a consumer to be aware of the types of information used by a seller or other provider of a product or service to determine the consumer's eligibility for the product or service. It is also desirable for a consumer or other client to obtain information about different aspects of products and services (e.g., types of offers and rates for which the client may qualify) prior to initiating a transaction or sharing any personal identification information with a seller or other provider of a product or service.

SUMMARY

Aspects and examples are disclosed for facilitating and signaling market transactions between providers of products or services and clients that consume or otherwise use the products and services. In one example, a processing device of a server system receives, via a data network, data from a computing system that describes attributes of a client that uses the computing system. The processing device can verify at least some of the received data to generate a client profile for the client. Based on verifying the data in the client profile, the processing device can notify one or more providers of a product or service that the client is interested in the product or service. Notifications transmitted to the providers of the product or service can maintain the anonymity of the client.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Figure 1:
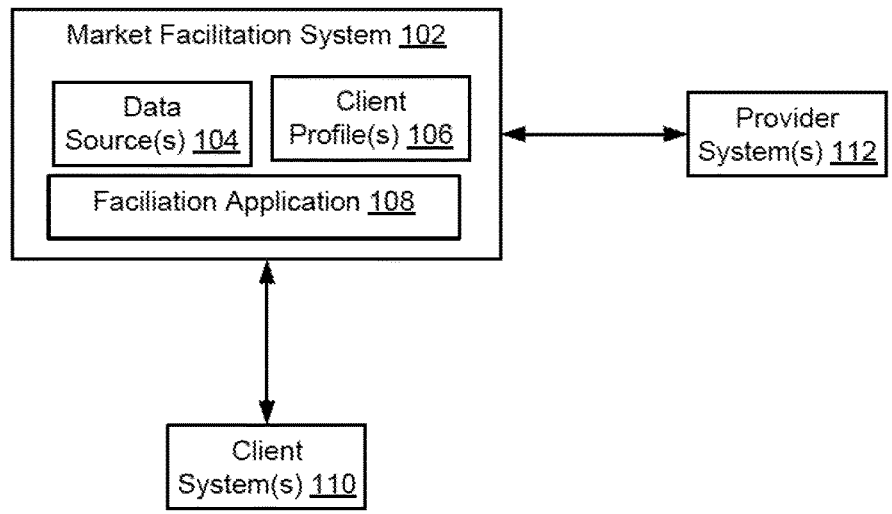
FIG. 1 is a block diagram illustrating an example of a market facilitation system that can be used to increase the amount and reliability of information available to parties in market transactions according to some aspects of the present disclosure.

Aspects and examples are disclosed for using a market facilitation system to facilitate market transactions between providers of products or services and clients that consume or otherwise use the products and services and to signal information about a market participant (e.g., the type of participant, the participant's needs, etc.) for these transactions. In some aspects, the market facilitation system can allow consumers, buyers, and other clients to proactively manage and benefit from their personal data by obtaining knowledge and analytical insights about a market in which the clients wish to participate. The market facilitation system can also allow consumers, buyers, and other clients to utilize their data in securing services and products at prices that satisfy specific consumer profiles and market needs.

In accordance with some aspects, a market facilitation system is provided. The market facilitation system can receive data from a client (e.g., a buyer or other consumer) that describes one or more attributes of the client. For example, the market facilitation system can be a server that is accessible via the Internet and that receives information via a web page. This client information may include, for example, a consumer's name or other personal identification information, the client's education level, the client's income level, etc. The market facilitation system can generate a client profile in which at least some of the received data is verified. For example, the market facilitation system can access one or more verified data sources (e.g., credit reporting databases) to verify that the data provided by the client via the web page or other interface matches the corresponding data in the verified data sources. Based on verifying the data in the client profile, the market facilitation system can notify one or more sellers or other providers of a product or service that the client is interested in the product or service. For example, a client who uses the market facilitation system can request one or more quotes for a loan or other financial service. The market facilitation system can provide verified data of the client to providers of the loan or other financial service along with a request for quotes. The market facilitation system can provide the verified data to the providers in a manner that maintains the anonymity of the client. For example, when notifying providers of the client's interest in a product or service, the market facilitation system can provide information such as the user's income level, duration of employment, and city of residence, but can omit information such as the user's name, social security number, or any other information that may be usable by a provider to uniquely identify the client.

As used herein, the term "client" can refer to any individual or other entity that may purchase, consume, or otherwise utilize a product or a service that can be obtained from a provider. In some aspects, a client can be a purchaser of a product or service. In additional or alternative aspects, a client can be an individual or entity who uses a product or service under conditions specified by a provider in addition to or instead of the client making payments to the provider.

As used herein, the term "provider" can refer to any individual or other entity that may manufacture, sell, perform, or otherwise provide access to a product or a service. In some aspects, a provider can be an employer who is seeking to identify potential candidates for employment or contracting opportunities. In additional or alternative aspects, a provider can be an individual or entity who provides a product or service under conditions specified by a provider in addition to or instead of receiving payment from the client. Non-limiting examples of a provider include financial institutions, banks, automobile dealers, retailers, insurers, etc.

As used herein, the term "personal identification information" can refer to any information that can be used to uniquely identify an individual or other entity. In some aspects, personal identification information can include information that can be used on its own to identify an individual or entity, such as (but not limited to) a legal name, a social security number, an e-mail address, etc. In other aspects, personal identification information can include information that can be used in combination with other information to identify an individual or entity, such as (but not limited to) a street address or other geographical location.

In some aspects, a client can opt in to services provided by the market facilitation system. Opting in to services provided by the market facilitation system can allow for a credible signaling process that includes verifying the client's relevant attributes and creating a profile of the client type. The client profile can include both static data elements and dynamic data elements. These data elements can be tagged or otherwise identified as either verified or un-verified, depending on the market facilitation system's ability to verify the consumer-contributed information through a credible process. Examples of static data elements include a client's educational degrees, professional certifications, date of birth, social security number, and other data attributes that are time independent (i.e., do not expire). Dynamic data elements can have a limited period of time in which the data elements are valid before expiration. Dynamic data elements may be re-verified after a specified time period. Examples of dynamic data elements include credit scores, income levels, employment information, assets possessed by a client (e.g., real or personal property, securities, etc.), address, organizational affiliations, interest of the client in a product or service, etc. A client may also populate the client profile by instructing or otherwise permitting the market facilitation system to extract or otherwise access the relevant client data from other services or databases.

A buyer or other client can initiate a market transaction with a provider by requesting certain products or services. The market facilitation system can provide the buyer or other client with basic knowledge and information regarding the specific product or service of interest. The market facilitation system can also allow the buyer or other client to gain market insight by providing client-specific analytical data and benchmarks from prior market transactions performed by clients of the same type. In some aspects, the market facilitation system can update or re-verify the dynamic data attributes required to fulfill the request. The market facilitation system can allow the client to anonymously notify providers in a market that the client is interested in initiating a transaction. In additional or alternative aspects, the market facilitation system can serve as a market intermediary by soliciting offers on the client's behalf. The client can evaluate the various offers solicited by market facilitation system. The client may disclose the client's personal information to specific sellers or other providers after evaluating the various offers solicited by market facilitation system.

In some aspects, consumers and other clients can credibly signal their type prior to engaging in a transaction with providers of products or services. The market facilitation system can obtain consent from client for managing client-provided information in various signaling operations. The market facilitation system can also provide analytical and marketing operations using available data assets. The market facilitation system can create greater value for market participants such that buyers or other clients gain knowledge and market transparency with respect to certain markets. The buyers or other clients can conserve time and money when seeking services and products by having sellers and other providers submit offers for the business of the buyer or other client. Sellers or other providers can thus receive a qualified buyer or other client of a known type, and thereby engage in a transaction having lower risks and costs. In additional or alternative aspects, the market facilitation system can also receive non-signaled information on an aggregate level that allows the providers to better determine a target offer without having to interact with a potential customer. This segmentation feature can provide a more accurate offer for the buyer or other client, can reduce inefficiency, and can increase the seller's credibility with the buyer.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a block diagram illustrating an example of a market facilitation system 102 that can be used to increase the amount and reliability of information available to parties in market transactions according to some aspects.

The market facilitation system 102 can include one or more server devices. The one or more server devices can include or can otherwise access one or more non-transitory computer-readable media. One or more of the data sources 104, the client profiles 106, and the facilitation application 108 can be stored on the non-transitory computer-readable media. The market facilitation system 102 can also include one or more processing devices that is capable of executing the facilitation application 108 to perform operations described herein.

The client profiles 106 can be stored in, for example, a database or other suitable data source. The client profiles 106 can include data regarding respective clients. The data included in the client profiles 106 can be received from one or more client systems 110. The market facilitation system 102 can verify at least some of the data received from the a client system 110 by comparison with data received from external sources, transactional data collected by the market facilitation system 102, or other data sources.

The data sources 104 can include, for example, secure and credentialed databases managed by or otherwise accessible by the facilitation application 108. The data sources 104 can include internal databases or other data sources that are stored at or otherwise accessible to the market facilitation system 102. The data sources 104 can also include external databases that are accessible to the market facilitation system 102 via external networks. Non-limiting examples of data stored in the data sources 104 include verified credit data, verified education data, verified employment data, verified income data, verified tax data, verified asset data (e.g., property records or verified data regarding other assets possessed by a client), verified data from service providers (e.g., cable television companies, telecommunications operators, and utility providers), and other types of verified client information. In some aspects, data from multiple data sources 104 can be linked to or otherwise associated with a given client profile 106 using a referential keying system.

In some aspects, the data sources 104 (which may include internal or external databases) may be data storage devices controlled by the owner or operator of the market facilitation system 102. The data sources 104 can include verified client-related information from trusted sources. The data sources 104 can be updated periodically or continuously. In other aspects, the internal or external databases are controlled by an entity other than the owner of the market facilitation system 102.

The market facilitation system 102 can electronically communicate with one or more client systems 110 and one or more provider systems 112 via one or more data networks. The communications over these data networks can be performed using any communication protocol or group of communication protocols suitable for establishing a secure communication link. A client system 110 can include any computing device or other communication device operated by a consumer, a buyer, or other client. A provider system 112 can include any computing device or group of computing devices operated by a seller, lender, or other provider of products or services.

In some aspects, the market facilitation system 102 can implement one or more procedures to secure communications between the market facilitation system 102 and client systems 110 and the provider systems 112. Non-limiting examples of features provided to protect data and transmissions between the market facilitation system 102 and client systems 110 and the provider systems 112 include secure web pages, encryption, firewall protection, network behavior analysis, intrusion detection, etc. In some aspects, transmissions with provider systems 112 can be encrypted using public key cryptography algorithms using a minimum key size of 128 bits. In additional or alternative aspects, website pages that request personal information can be delivered through HTTPS or other secure server communications protocols. In additional or alternative aspects, electronic communications that include personal information can be transmitted using Secure Sockets Layer ("SSL") technology or other suitable secure protocols. Extended Validation SSL certificates can be utilized to clearly identify a website's organization identity. In some aspects, timeout features can log out a user after a predetermined time of inactivity. In another non-limiting example, physical, electronic and procedural measures can be utilized to safeguard personal information and data from unauthorized access and disclosure.

The market facilitation system 102 can communicate with one or more client systems 110 and a client-contributed database by applying authentication and authorization rules. The authentication and authorization rules can be used to authenticate and authorize client system 110 to receive information from the market facilitation system 102. The market facilitation system 102 can communicate with the provider systems 112 through a network or other information exchange. The provider of a product or service and the owner or operator of the market facilitation system 102 may be members of this network or information exchange.

In some aspects, a consumer or other entity accessing the client system 110 can use the market facilitation system 102 to perform operations related to securely creating, updating, managing, or otherwise using a client profile 106. One non-limiting example of these operations is creating a client profile 106. Creating a client profile 106 can involve the client agreeing to one or more terms of service for creating the client profile 106. The terms of service can include granting the client's consent to use information that the client provides to the market facilitation system 102 via the client profile 106. Another non-limiting example of these operations is performing credentialing and password recovery operations. Another non-limiting example of these operations involves the client system 110 being used by the client to provide data for one or more data attributes in the client profile 106. These attributes can include (but are not limited to) a name, a social security number, a date of birth, demographics information, employment history, income by source, assets, educational attainment, organizational affiliation or memberships, and any other relevant data. The facilitation application 108 can establish a consumer type for the client profile 106 based on one or more relevant data attributes for a specific transaction or type of transaction (e.g., income band, tenure, credit band, educational progress, etc.). Other non-limiting examples of these operations include managing access to data provided via the client profile 106, de-activating the client profile 106, purging data from the client profile 106 (or the entire client profile 106) from the market facilitation system 102, and any other account management functions.

In additional or alternative aspects, a consumer or other entity accessing the client system 110 can access the market facilitation system 102 to access benchmarks and other analytical data generated by the market facilitation system 102. In one non-limiting example, the market facilitation system 102 can provide information regarding the prices and values for products or services. The market facilitation system 102 can provide this information by analyzing transaction data captured through the market facilitation system 102. The market facilitation system 102 can additionally or alternative provide this information by analyzing information obtained through other resources. Such information can allow a client or other consumer to access personal benchmarks for self-assessment. Such information can also allow the client or other consumer to compare these personal benchmarks for product and service prices against those of similar clients or types of clients. In another non-limiting example, the market facilitation system 102 can allow a consumer or other client to view personal benchmarks and analytical data based on both the client's personal transaction history and that of other consumers of a similar type. A client type can be established by utilizing a combination of data elements that can be predictive of consumer risk and purchasing ability when entering a specific type of market transaction. In another non-limiting example, the market facilitation system 102 can provide links to access personal data reports, credit reports, credit scores, and similar reports. In another non-limiting example, the market facilitation system 102 can allow a client or other consumer to enroll in credit, identity, financial, and other personal solutions (e.g., credit monitoring and identity protection).

In additional or alternative aspects, the facilitation application 108 can provide a client or other consumer with information related to specific types of products or services. For example, the facilitation application 108 can provide a client or other consumer with information regarding general principles of mortgages, automobile purchases, financing, student loans, financial planning, insurance planning, investment planning, retirement planning, estate planning, tax planning, etc. The facilitation application 108 can provide a client or other consumer with links to external content (e.g., blogs or other websites) that provide information related to specific types of products or services.

In additional or alternative aspects, the facilitation application 108 can allow the consumer to seek favorable offers and terms from sellers and financial service providers. In one non-limiting example, the facilitation application 108 can anonymously transmit the client's type and interest to market participants interested in transacting with a consumer or other client of the given type and interest. In another non-limiting example, the facilitation application 108 can compile a list of offers that includes prices determined by credibly signaling the client type to the providers in a relevant market. The offers can be presented to the client for analysis and review. In another non-limiting example, the facilitation application 108 can provide a client with information regarding other clients' ratings and reviews for a seller or other provider that is associated with a given offer. In another non-limiting example, the facilitation application 108 can allow a client to select and pursue offers of interest by connecting the client with a given provider associated with the offer. In another non-limiting example, the facilitation application 108 can allow the consumer to rate the seller based on overall experience satisfaction.

In additional or alternative aspects, the facilitation application 108 can allow the consumer to opt-in for preferred offers and promotional discounts. In one non-limiting example, the facilitation application 108 can allow a consumer to opt in to a service for receiving tailored offers and product discounts based on the consumer's type. In another non-limiting example, the facilitation application 108 can allow a consumer to indicate general categories of product or service interest. In another non-limiting example, the facilitation application 108 can transmit or facilitate the transmission of special offers and promotional discounts based on compiling aggregate analytical data and projections of the types, needs, and interest of different consumers. In another non-limiting example, the facilitation application 108 can proactively push new offers and promotional discounts to consumers who might be interested in such products or services. In another non-limiting example, the facilitation application 108 can allow or facilitate the purchase of products and services of interest by a consumer.

In additional or alternative aspects, the facilitation application 108 can allow sellers or other providers of products or services to understand one or more characteristics of consumers or other clients in a given market without the seller or provider having individual knowledge of different consumers or other clients (e.g., knowledge obtained through direct transactions with customers). For example, the market facilitation system 102 can provide a secure log-in interface for providers, where the interface for providers is separate from an interface used by clients. In one non-limiting example, a seller or other provider can use the market facilitation system 102 to augment anonymously provided information related to employment, income, education data, etc. with data such as credit and marketing information for the product or service offers that the providers wish to provide. In another non-limiting example, a seller or other provider can use the market facilitation system 102 to select segments of a market for campaigns and to determine when offers will be available to certain segments. In some aspects, any advertising content or other content of a marketing campaign can be reviewed by a provider or operator of a communication channel and prevented from circulation via the communication channel.

Figure 2:
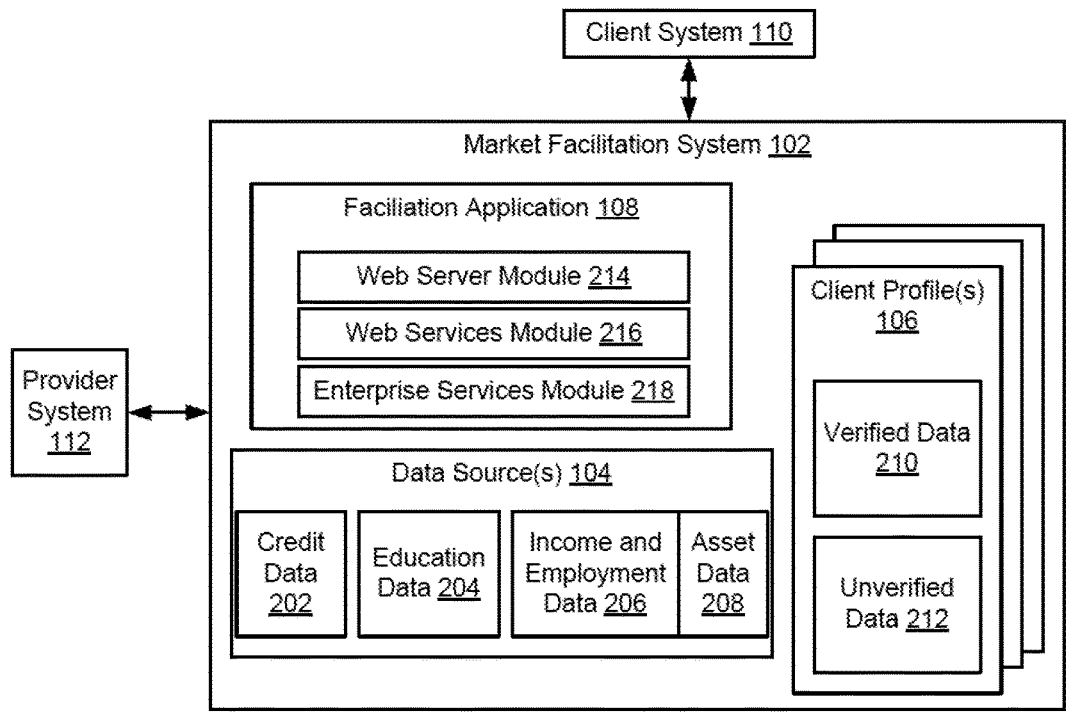
FIG. 2 is a block diagram illustrating an example of an implementation of the market facilitation system of FIG. 1 according to some aspects of the present disclosure.

FIG. 2 is a block diagram illustrating an example of an implementation of the market facilitation system 102. As depicted in FIG. 2, the data sources 104 can include one or more of credit data 202, education data 204, income and employment data 206, asset data 208, or any other data about clients that can be accessed by the market facilitation system 102. Each of the client profiles 106 can include one or more of verified data 210 and unverified data 212. Each of the client profiles 106 can also include data elements that can be verified by the market facilitation system 102 and/or data elements that cannot be verified by the market facilitation system 102.

The facilitation application 108 can include one or more of a web server module 214, a web services module 216, and an enterprise services module 218. For example, the web server module 214 can be executed by a suitable processing device to provide one or more web pages or other interfaces to a client system 110. The web pages or other interfaces can include content provided by the web services module 216. The web services module 216 can generate this content by executing one or more analytical algorithms using information retrieved from one or more of the data sources 104. The enterprise services module 218 can be executed to retrieve the information from one or more of the data sources 104. For illustrative purposes, FIG. 2 depicts the web server module 214, the web services module 216, and the enterprise services module 218 as different modules. However, other implementations are possible. For example, one or more software modules can perform one or more functions of the web server module 214, the web services module 216, and the enterprise services module 218.

Figure 3:
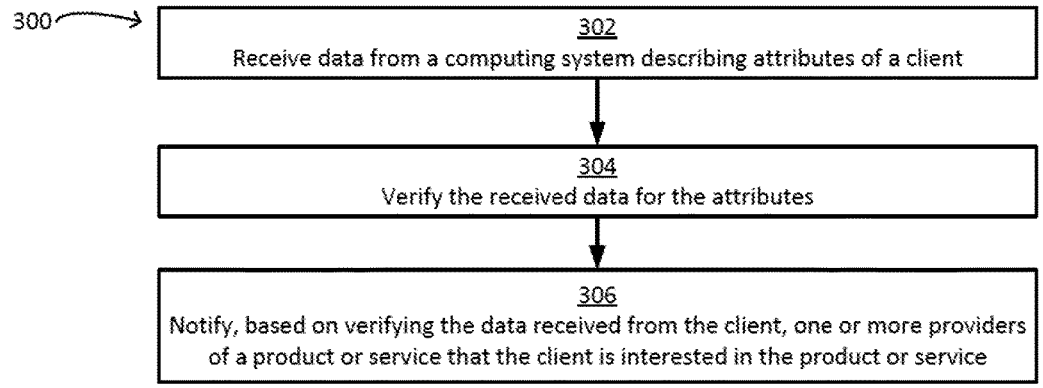
FIG. 3 is a flow chart illustrating an example of a process for increasing the amount and reliability of information available to parties in market transactions according to some aspects of the present disclosure.

The facilitation application 108 can execute one or more processes for facilitating and signaling market transactions. For example, FIG. 3 is a flow chart illustrating an example of a process 300 for increasing the amount and reliability of information available to parties in market transactions according to some aspects. For illustrative purposes, the process 300 is described with respect to the implementations described above with respect to FIGS. 1-2. Other implementations, however, are possible.

The process 300 can involve receiving, via a data network, data from a computing system describing attributes of a client using the computing system, as depicted at block 302. A suitable processing device or group of processing devices of the market facilitation system 102 can execute the facilitation application 108 and thereby perform one or more operations for receiving data from a client system 110 that describes attributes of a client using the client system 110. For example, the facilitation application 108 can generate a web page or other suitable interface that can be used to solicit data from a client. The facilitation application 108 can transmit the web page or other interface to the client system 110 via a data network. The client system 110 can be used by the client to enter the data into one or more fields of the web page or other interface. The data entered using the client system 110 can be transmitted to the market facilitation system 102 via a suitable data network.

In some aspects, the market facilitation system 102 can perform one or more operations that authenticate the client or otherwise establish the identity of the client using the client system 110. For example, the market facilitation system 102 may include a database or other data source with information related to the client's credit or may be in communication with another system that includes such a database or other data source. The database may include one or more credit files for the client. The market facilitation system 102 can compare the data received from the client with the data included in the credit files for the client. The market facilitation system 102 can verify the accuracy of the data received from the client based on the comparison.

The process 300 can also involve verifying at least some of the received data to generate a client profile 106 for the client, as depicted at block 304. For example, a suitable processing device or group of processing devices of the market facilitation system 102 can execute the facilitation application 108 and thereby perform one or more operations for verifying at least some of the received data to generate a client profile 106 for the client. In some aspects, the facilitation application 108 can perform one or more automated or semi-automated processes to verify the data. For example, the facilitation application 108 can be executed by the processing device in response to receiving data from the client and can verify the received data by comparing the received data to third-party databases, such as (but not limited to) credit bureau data, income and employment data, data from service providers (e.g., data from cable television providers, telecommunications operators, data from utility providers), data from educational institutions (e.g., degree, graduate, and enrollment data), etc. In additional or alternative aspects, an operator of the market facilitation system can use data received via the facilitation application to verify the data. For example, data verification may be performed by contacting individuals, institutions, employers, or any other entity that may credibly verify certain aspects of the client profile data.

The process 300 can also involve notifying, based on verifying the data received from the client system 110, one or more providers of a product or service that the client is interested in the product or service, as depicted at block 306. A suitable processing device or group of processing devices of the market facilitation system 102 can execute the facilitation application 108 and thereby perform one or more operations for notifying providers of a product or service that the client is interested in the product or service. For example, the facilitation application 108 can transmit a suitable electronic communication (e.g., an Extensible Markup Language ("XML") document, a web page, an e-mail, etc.) to one or more provider systems 112 associated with the providers of a product or service. The electronic communication can include a notification that the client is interested in a product or service.

In some aspects, the market facilitation system 102 can signal a client's interest in a transaction in a manner that maintains the client's anonymity. For example, the market facilitation system 102 can retrieve a subset of data from the verified client profile 106 that describes attributes of the client other than personal identification information of the client. The market facilitation system 102 can transmit the subset of data to sellers without the personal identification information when signaling the client's interest in a transaction with the seller. For example, the market facilitation system 102 can transmit data such as the client's credit score band (e.g., "680 to 700"), the client's income band (e.g., "$120,000 to $130,000), the client's tenure band (e.g., "employment with the same entity for five to seven years"), the client's educational level (e.g., "bachelor's degree"), or any other attributes that may be used by the seller in identifying clients that are eligible for specific types of transactions.

In some aspects, the market facilitation system 102 can use a "pull" mode in which information about various sellers is provided to a client in response to receiving a request from the client for information about a specific product or service or about a specific type of product or service. In a non-limiting example, a client can access the market facilitation system 102. The client can transmit a request for a loan to the market facilitation system 102 via an interface provided by the market facilitation system 102. The market facilitation system 102 can determine one or more characteristics of a loan for which the client is eligible. In some aspects, the market facilitation system 102 can communicate with one or more third-party lenders to determine the characteristics of the loan. For example, the market facilitation system 102 may provide data from the verified client profile 106 to the third-party lenders with a request for information about a loan for which the client is eligible. The data from the verified client profile 106 can be provided without providing personal identification information of the client (e.g., name, social security number, etc.). The third-party lenders can respond by providing information for potential loan options to the market facilitation system 102. The market facilitation system 102 can provide the information received from the third-party lenders to the client via an interface of the market facilitation system 102.

In additional or alternative aspects, the market facilitation system 102 may access stored information about one or more third party lenders. For example, a third party lender may have previously transmitted one or more business rules to the market facilitation system 102 that identify how the third party lender makes decisions about prospective borrowers. The market facilitation system 102 can execute the one or more business rules with data retrieved from the verified client profile 106 to determine which loan options may be available from the third party lender for a client having a given client profile 106 or type of client profile 106. The market facilitation system 102 can provide the information about the loan options determined from the business rules to the client via an interface of the market facilitation system 102. In some aspects, the market facilitation system 102 can provide information via the interface whether the potential loan options were determined either by contacting the third party lenders in response to the client's request or by executing business rules previously provided by the third party lender.

In additional or alternative aspects, the market facilitation system 102 can use a "push" mode in which information about various sellers is provided to a client without the client specifically requesting a specific product or service. The "push" mode can involve receiving a description of at least one aspect of a product or service from the client system 110 and determining that an offered product or service matches the description received from the client system 110. For example, the client may use the client system 110 to access the market facilitation system 102 via a data network. The client may input data into an interface of the market facilitation system 102 (e.g., a web page). The input can be transmitted to the market facilitation system via the data network. The input can instruct the market facilitation system 102 to notify the client if certain types of products or service become available for which the client is eligible. In a non-limiting example, the client may instruct the market facilitation system 102 to notify the client if, over a specified amount of time, a lender is willing to make a loan to the client for a specified amount (or range of amounts) at a specified interest rate (or range of interest rates).

In some aspects, the market facilitation system 102 can provide a client with information about the products or services for which the client is eligible. The market facilitation system 102 can also provide the client with information regarding the types of information about the client that are used by sellers to determine the client's eligibility for certain products or services.

In some aspects, the market facilitation system 102 can increase the efficiency of sales efforts from the perspective of sellers of products and services. For example, the market facilitation system 102 can reduce or eliminate the amount of time spent on soliciting business from ineligible customers, thereby allowing a seller to focus marketing efforts on prospective customers who are eligible for given products or services. The market facilitation system 102 can increase the efficiency of sales efforts from the perspective of clients. For example, using the verified client profile 106 to signal the client's interest in a transaction can also reduce the number of results provided to the client in response to a request for a product or service. For example, the market facilitation system 102 can present only those products or services for which a client may be eligible based on the information from the verified client profile 106.

In additional or alternative aspects, the market facilitation system 102 can reduce the number of credit queries that are generated by a client shopping for a given product or service. For example, each seller contacted by a given user to inquire about a product or service may query a credit reporting agency regarding the credit worthiness of the client. Larger numbers of requests for credit information from a credit reporting agency that are received by the credit reporting agency within a given period of time may negatively impact a client's credit score. Using the market facilitation system 102 to proactively identify sellers of products or services for which the client is eligible can allow the client to limit his or her efforts to those sellers, products, or services. Limiting the client's inquiries to those sellers can thereby reduce the number of inquiries received by a credit reporting agency from those products or services.

Figure 4:
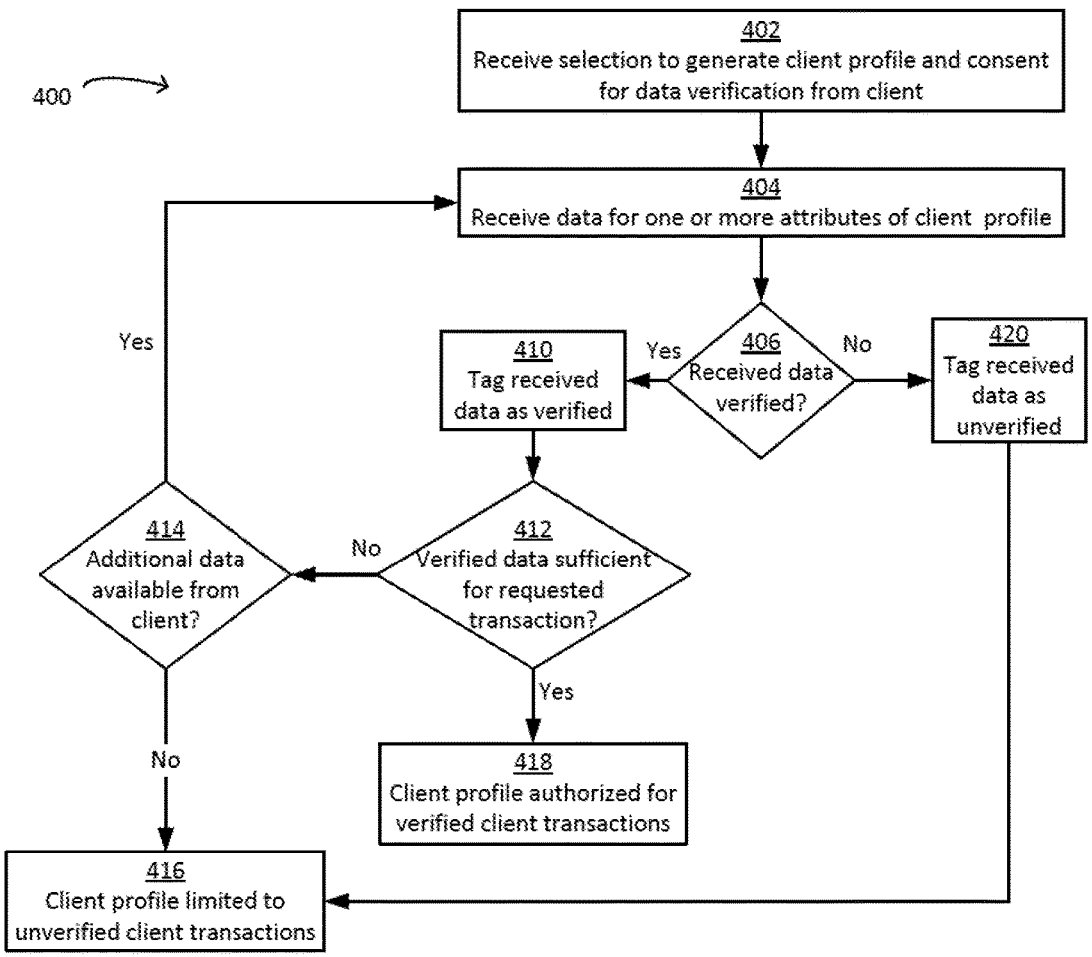
FIG. 4 is a flow chart illustrating an example of a process for generating a client profile that may be used in the market facilitation system of FIG. 1 according to some aspects of the present disclosure.

FIG. 4 is a flow chart illustrating an example of a process 400 for generating a client profile 106 that may be used in the market facilitation system 102 according to some aspects. The process 400 can be executed by the market facilitation system 102 to establish a client profile 106 and identify a client type through interactions with the client system 110 and with other databases and data sources, such as those in FIGS. 1-2. For illustrative purposes, the process 400 is described with respect to the implementations described above with respect to FIGS. 1-2. Other implementations, however, are possible.

The process 400 can involve receiving a request to generate a client profile 106, as depicted at block 402. In some aspects, the request can include data indicating the consent by a consumer or other client to one or more data verification or signaling processes to be performed by the facilitation application 108. A processing device of the market facilitation system 102 can receive the request via a suitable data network, such as (for example), the Internet. In a non-limiting example, one or both of the request and the consent can be received via a web page or other graphical interface provided to the consumer or other client over the data network.

The process 400 can also involve receiving data for one or more data attributes of the client profile 106, as depicted at block 404. A processing device of the market facilitation system 102 can receive the data via a suitable data network, such as (for example), the Internet. In a non-limiting example, the facilitation application 108 can generate a web page or other graphical interface for soliciting the data. The interface can be provided to the consumer or other client over the data network.

The process 400 can also involve determining whether the received data is verified, as depicted at block 406. For example, a processing device of the market facilitation system 102 can execute the facilitation application 108 to perform one or more verification operations. These verification operations may include (but are not limited to) comparing the data received from a client system 110 with data in one or more of the data sources 104.

If the received data is verified, the process 400 can also involve tagging the received data as verified, as depicted at block 408. For example, a processing device of the market facilitation system 102 can execute the facilitation application 108 to tag the received data as verified. Tagging the received data as verified can involve the processing device accessing a record for the client profile 106 in a database or other suitable data source. Tagging the received data as verified can also involve the processing device modifying the accessed record for the client profile 106 to include an identifier with each verified attribute. For example, a record for the client profile 106 can include a field for "income band" and a field for "verified." If the facilitation application 108 successfully verifies the value in the field "income band," the facilitation application 108 can update the field "verified" with the value "true."

The process 400 can also involve determining whether the verified data is sufficient to verify the consumer or other client for one or more specified transactions, as depicted at block 412. For example, a processing device of the market facilitation system 102 can execute the facilitation application 108 to determine whether the verified data is sufficient to verify the consumer or other client for one or more specified transactions.

If the facilitation application 108 determines at block 412 that the verified data is not sufficient to verify the consumer or other client for one or more specified transactions, the process 400 can also involve determining whether additional data can be obtained for the client profile 106, as depicted at block 414. If additional data can be obtained for the client profile 106, the process 400 can return to block 404. If additional data cannot be obtained for the client profile 106, the process 400 can involve limiting the client profile 106 to transactions allowing unverified clients, as depicted at block 416.

If the facilitation application 108 determines at block 412 that the verified data is not sufficient to verify the consumer or other client for one or more specified transactions, the process 400 can also involve identifying the client profile 106 as being authorized for the verified transactions, as depicted at block 418.

If the facilitation application 108 determines at block 406 that the received data is not verified, the process 400 can also involve tagging at least some of the data received via the client profile 106 as unverified, as depicted at block 420. The process 400 can also involve limiting the client profile 106 to transactions allowing unverified clients, as depicted at block 416.

Figure 5:
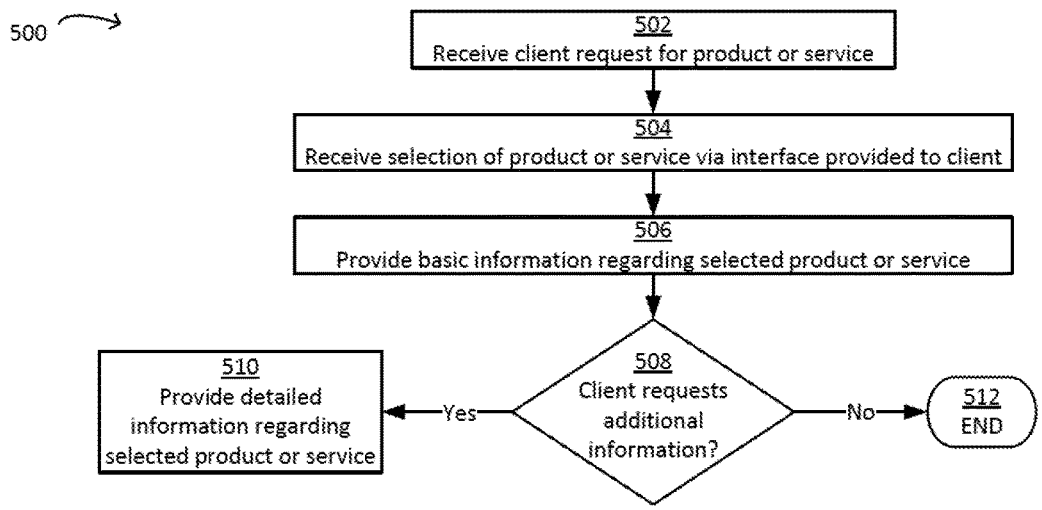
FIG. 5 is a flow chart illustrating an example of a process for using the market facilitation system of FIG. 1 to provide information about products or services to a client according to some aspects of the present disclosure.

FIG. 5 is a flow chart illustrating an example of a process 500 for using the market facilitation system 102 to provide information about products or services to a client according to some aspects. The process 500 can be executed by the market facilitation system 102 to provide financial education information to the user of a client system 110 over one or more networks. For illustrative purposes, the process 500 is described with respect to the implementations described above with respect to FIGS. 1-2. Other implementations, however, are possible.

The process 500 can involve receiving a client request for a product or service, as depicted at block 502. For example, a suitable processing device or group of processing devices of the market facilitation system 102 can execute the facilitation application 108 and thereby perform one or more operations for receiving a client request for a product or service over a data network from a client system 110. In some aspects, a web page that includes a graphical interface can be provided by the facilitation application 108 over a data network in response to the client system 110 accessing a website hosted by or otherwise accessible to the market facilitation system 102. The graphical interface can receive inputs from the client system 110 that define a client's request for a product or service. The inputs received from the client system 110 that define the client's request for a product or service can be received by the market facilitation system 102 over a data network. In other aspects, an electronic communication (e.g., an e-mail) can be received by the market facilitation system 102 from the client system 110 via a suitable data network. The electronic communication can include data that defines a client's request for a product or service.

The process 500 can also involve receiving a selection of a product or service via an interface provided to the client, as depicted at block 504. For example, a suitable processing device or group of processing devices of the market facilitation system 102 can execute the facilitation application 108 and thereby perform one or more operations for receiving a selection of a product or service via an interface provided to the client. In some aspects, the facilitation application 108 can generate a web page including a drop-down menu or other suitable interface with which a user can interact via a client system 110. Inputs received to the interface by the client system 110 can identify the product or service. The inputs received to the interface can be transmitted to the market facilitation system 102 from the client system 110 via a suitable data network.

The process 500 can also involve providing basic information to the client regarding the selected product or service, as depicted at block 506. For example, a suitable processing device or group of processing devices of the market facilitation system 102 can execute the facilitation application 108 and thereby perform one or more operations for providing basic information to the client regarding the selected product or service. The basic information can include, for example, a list of products or services and an associated list of providers for the products or services. The basic information may include (but is not limited to) the names of the products or services, basic description of features, general terms, equivalent annual percentage rate. In some aspects, the facilitation application 108 can generate a web page including a graphical interface that includes the basic information. In other aspects, the facilitation application 108 can transmit an electronic communication (e.g., an e-mail, a text message, a facsimile transmission, etc.) to the client system 110 or other communication device associated with the client that includes the basic information. In other aspects, the facilitation application 108 can transmit an electronic communication (e.g., an e-mail, a text message, a facsimile transmission, etc.) to the client system 110 or other communication device associated with the client that includes information that can be used by the client system 110 to access the basic information (e.g., an e-mail or text message having a link to a web page).

The process 500 can also involve determining whether the client has requested additional information about one or more products or services identified in the basic information, as depicted at block 508. A suitable processing device or group of processing devices of the market facilitation system 102 can execute the facilitation application 108 and thereby perform one or more operations for determining whether the client has requested additional information about one or more products or services identified in the basic information. For example, the facilitation application 108 may receive a request for additional information about one or more products or services identified in the basic information provided to a client. The request for additional information can be received from the client system 110 via a suitable data network. The client system 110 may generate and transmit the request for additional information by interacting with an interface (e.g., a web page) generated by the facilitation application 108 and transmitted from the market facilitation system 102 to the client system 110 via a suitable data network.

If the client has requested additional information, the process 500 can also involve providing detailed information to the client system 110 regarding the selected product or service, as depicted at block 510. For example, a suitable processing device or group of processing devices of the market facilitation system 102 can execute the facilitation application 108 and thereby perform one or more operations for providing the detailed information to the client system 110. The detailed information can include, for example, the details of the product or service available to the client from a particular provider or subset of providers. Detailed information may include the specific terms and conditions relating to a particular offer or set of offers. For example, the detailed information may include specific product features, upfront costs, interest rates, payment terms, detailed descriptions of one or more terms and conditions, and any other relevant information. In some aspects, the facilitation application 108 can generate a web page including a graphical interface that includes the detailed information. In other aspects, the facilitation application 108 can transmit an electronic communication (e.g., an e-mail, a text message, a facsimile transmission, etc.) to the client system 110 or other communication device associated with the client that includes the detailed information. In other aspects, the facilitation application 108 can transmit an electronic communication (e.g., an e-mail, a text message, a facsimile transmission, etc.) to the client system 110 or other communication device associated with the client that includes information that can be used by the client system 110 to access the detailed information (e.g., an e-mail or text message having a link to a web page).

If the client has not requested additional information, the process 500 can terminate, as depicted at block 512.

Figure 6:
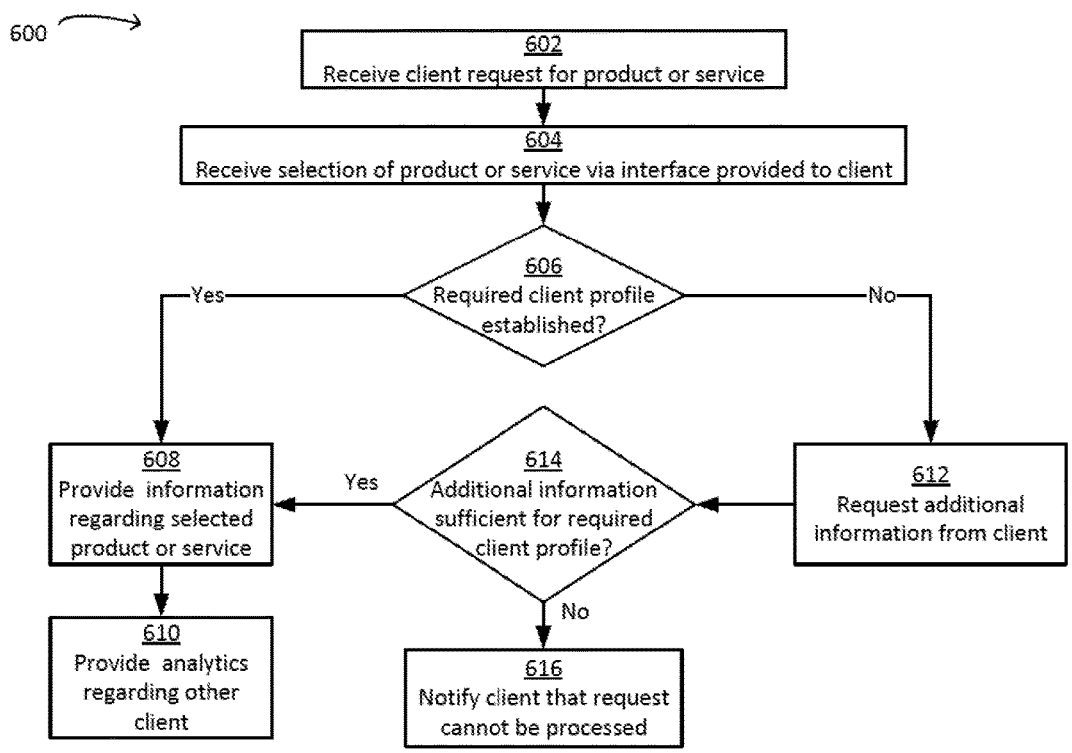
FIG. 6 is a flow chart illustrating an example of a process for determining whether a client profile of the market facilitation system of FIG. 1 has sufficient information for providing information about products or services to a client associated with the profile according to some aspects of the present disclosure.

FIG. 6 is a flow chart illustrating an example of a process 600 for determining whether a client profile 106 of the market facilitation system 102 has sufficient information for providing information about products or services to a client associated with the profile according to some aspects. The process 600 can be performed by the market facilitation system 102 to provide benchmarking and analytical insights to a user of a client system 110. For illustrative purposes, the process 600 is described with respect to the implementations described above with respect to FIGS. 1-2. Other implementations, however, are possible.

The process 600 can involve receiving a client request for a product or service, as depicted at block 602. For example, a suitable processing device or group of processing devices of the market facilitation system 102 can execute the facilitation application 108 and thereby perform one or more operations for receiving a client request for a product or service over a data network from a client system 110.

The process 600 can also involve receiving a selection of a product or service via an interface provided to the client, as depicted at block 604. For example, a suitable processing device or group of processing devices of the market facilitation system 102 can execute the facilitation application 108 and thereby perform one or more operations for receiving a selection of a product or service via an interface provided to the client. In some aspects, the facilitation application 108 can generate a web page including a drop-down menu or other suitable interface with which a user can interact via a client system 110. Inputs received to the interface by the client system 110 can identify the product or service. The inputs received to the interface can be transmitted to the market facilitation system 102 from the client system 110 via a suitable data network.

The process 600 can also involve determining if a required profile for a client has been established, as depicted at block 606. Determining if a required profile for a client has been established can include, for example, determining whether a client profile 106 that is associated with the client request received at block 602 includes information for data attributes used by a provider to determine a client's eligibility for a product or service. A suitable processing device or group of processing devices of the market facilitation system 102 can execute the facilitation application 108 and thereby perform one or more operations for determining if a required client profile 106 has been established. In some aspects, these operations can include the facilitation application 108 communicating with one or more provider systems 112 to determine which data attributes a provider uses to evaluate a client's eligibility for a product or service. In other aspects, these operations can include the facilitation application 108 accessing one or more business rules that are stored in a non-transitory computer-readable medium of the market facilitation system 102 and that are associated with one or more providers. The business rules can identify the data attributes used by one or more providers to evaluate a client's eligibility for a product or service.

If a required profile has been established, the process 600 can also involve providing the information for the selected product or service to a client system 110, as depicted at block 610. For example, a suitable processing device or group of processing devices of the market facilitation system 102 can execute the facilitation application 108 and thereby perform one or more operations for providing the information to the client system 110. In some aspects, the facilitation application 108 can generate a web page including a graphical interface that includes the detailed information. In other aspects, the facilitation application 108 can transmit an electronic communication (e.g., an e-mail, a text message, a facsimile transmission, etc.) to the client system 110 or other communication device associated with the client that includes the information. In other aspects, the facilitation application 108 can transmit an electronic communication (e.g., an e-mail, a text message, a facsimile transmission, etc.) to the client system 110 or other communication device associated with the client that includes information that can be used by the client system 110 to access the information (e.g., an e-mail or text message having a link to a web page).

In some aspects, the process 600 can also involve providing analytical data regarding other clients to a client having a required profile, as depicted at block 612. For example, a suitable processing device or group of processing devices of the market facilitation system 102 can execute the facilitation application 108 and thereby perform one or more operations for providing analytical data to a client system 110. The analytical data can be provided in any suitable manner, such as (but not limited to) a web page or other electronic communication, as described above with respect to block 608. In other aspects, block 612 may be omitted.

In one non-limiting example, the market facilitation system 102 can generate analytical data comparing the client to other clients. The market facilitation system 102 can transmit the analytical data to the client. For example, the market facilitation system 102 can determine what other clients having similar client profiles 106 have been paying for similar products and services.

In additional or alternative aspects, the market facilitation system 102 can transmit information to the client that indicates how the client may be able expand his or her eligibility for different types of transactions. In one non-limiting example, the market facilitation system 102 can compare the client with other similarly situated clients. The market facilitation system 102 can determine the differences between the requesting client and other clients with respect to one or more attributes (e.g., income band, tenure band, education level). The market facilitation system 102 can also determine the differences between the requesting client and other clients with respect to the types of products or services for which the requesting client and other clients are eligible. For example, the market facilitation system 102 may determine that other clients within one or more higher-income bands, higher education levels, higher tenure bands, etc. may be eligible for higher loan amounts, lower interest rates, or other terms for a loan that are more favorable than a loan for which the requesting client is eligible.

In another non-limiting example, the market facilitation system 102 can provide one or more recommendations to the requesting client that may increase the client's options with respect to a given product or service. For example, the market facilitation system 102 may recommend that a client wait until his or her number of years employed at a given employer has increased above a threshold number before seeking a loan for a purchase.

In another non-limiting example, analytical data provided to a consumer can include a trended view of the client. For example, the facilitation application 108 can generate a report that includes one or more attributes of a client. The report can also include trends for those attributes. The report can also include an analysis based on the trends that allow a client to determine the types or other characteristics of products or services for which the client may be eligible in the future.

Returning to block 606, if a required profile has not been established, the process 600 can involve requesting additional information from the client system 110, as depicted at block 612. For example, a suitable processing device or group of processing devices of the market facilitation system 102 can execute the facilitation application 108 and thereby perform one or more operations for requesting the additional information. In some aspects, these operations can include identifying the data attributes used by the provider, identifying which of the identified data attributes are absent from the client profile 106, and providing a request to the client system 110 via a suitable data network. The request to the client system 110 provide via the data network may include (but is not limited to) one or more of presenting a web page that requests the additional information, transmitting an electronic communication to a client system 110 or other communication device that requests the additional information, etc. The process 600 can further also determining whether the client has provided additional information that is sufficient to establish the required profile, as depicted at block 614. The determination can be performed in a manner similar to that of block 606. If the client has provided additional information that is sufficient to establish the required profile, the process 600 can proceed to block 608. If the client has not provided additional information that is sufficient to establish the required profile, the process 600 can involve notifying the client system 110 that the request for the selected product or service cannot be processed, as depicted at block 614.

Figure 7:
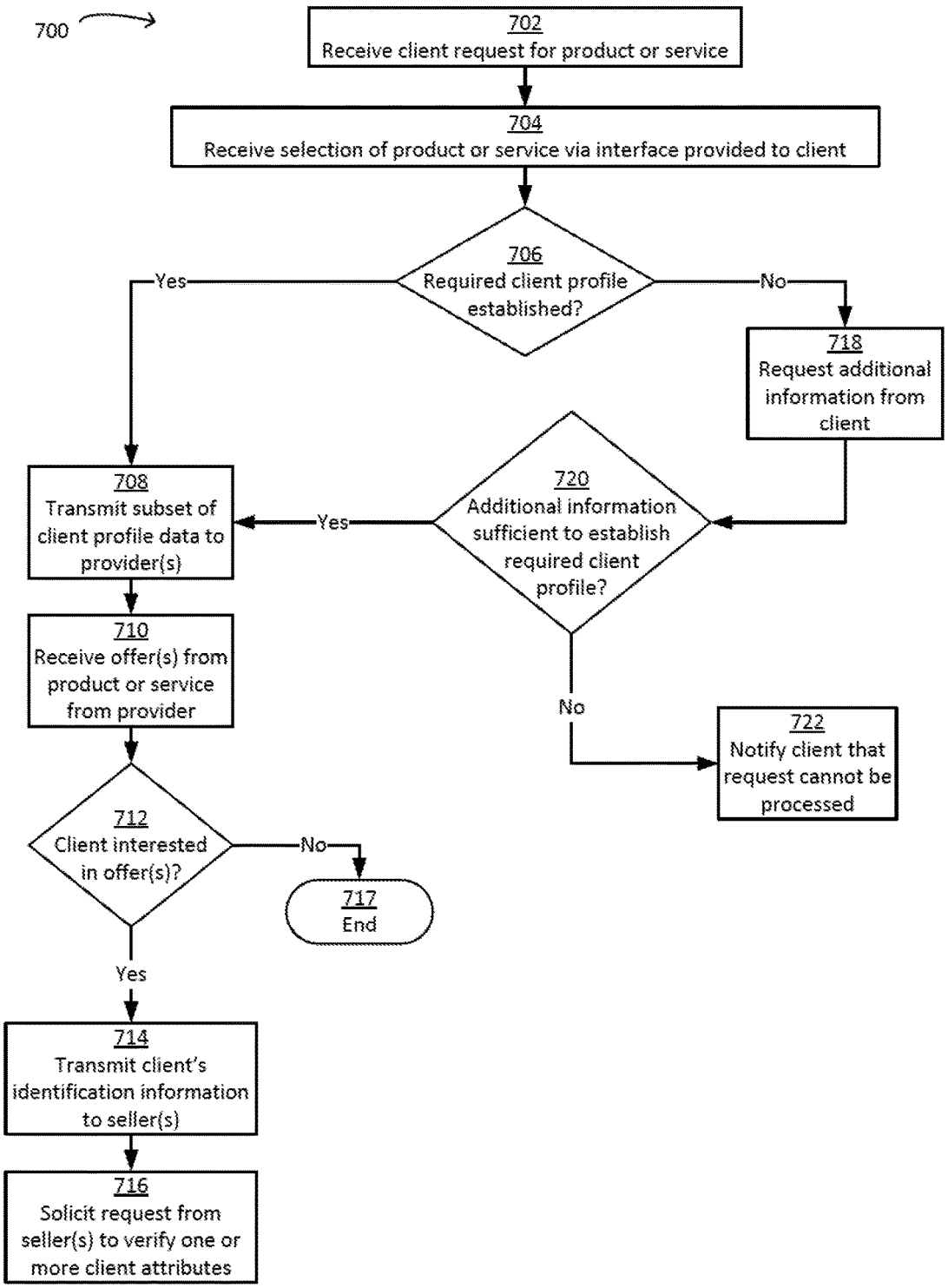
FIG. 7 is a flow chart illustrating an example of another process for using the market facilitation system of FIG. 1 to provide information about products or services to a client according to some aspects of the present disclosure.

FIG. 7 is a flow chart illustrating an example of a process 700 for using the market facilitation system 102 to provide information about products or services to a client according to some aspects. The process 700 can be executed by the market facilitation system 102 to provide product or service request functions to users of a client system 110 and to provide signaling functions to an operator of a provider system 112 over one or more networks. For illustrative purposes, the process 700 is described with respect to the implementations described above with respect to FIGS. 1-2. Other implementations, however, are possible.

The process 700 can involve receiving a client request for a product or service, as depicted at block 702. For example, a suitable processing device or group of processing devices of the market facilitation system 102 can execute the facilitation application 108 and thereby perform one or more operations for receiving a client request for a product or service over a data network from a client system 110.

The process 700 can also involve receiving a selection of a product or service via an interface provided to the client, as depicted at block 704. For example, a suitable processing device or group of processing devices of the market facilitation system 102 can execute the facilitation application 108 and thereby perform one or more operations for receiving a selection of a product or service via an interface provided to the client. In some aspects, the facilitation application 108 can generate a web page including a drop-down menu or other suitable interface with which a user can interact via a client system 110. Inputs received to the interface by the client system 110 can identify the product or service. The inputs received to the interface can be transmitted to the market facilitation system 102 from the client system 110 via a suitable data network.

The process 700 can also involve determining if a required profile for a client has been established, as depicted at block 706. Determining if a required profile for a client has been established can include, for example, determining whether a client profile 106 that is associated with the client request received at block 702 includes information for data attributes used by a provider to determine a client's eligibility for a product or service. A suitable processing device or group of processing devices of the market facilitation system 102 can execute the facilitation application 108 and thereby perform one or more operations for determining if a required client profile 106 has been established. In some aspects, these operations can include the facilitation application 108 communicating with one or more provider systems 112 to determine which data attributes a provider uses to evaluate a client's eligibility for a product or service. In other aspects, these operations can include the facilitation application 108 accessing one or more business rules that are stored in a non-transitory computer-readable medium of the market facilitation system 102 and that are associated with one or more providers. The business rules can identify the data attributes used by one or more providers to evaluate a client's eligibility for a product or service.

The process 700 can also involve transmitting a subset of the client profile 106 data to one or more provider systems 112, as depicted at block 708. For example, a suitable processing device or group of processing devices of the market facilitation system 102 can execute the facilitation application 108 and thereby perform one or more operations for transmitting client profile 106 data to one or more provider systems 112. The facilitation application 108 can extract a subset of client profile 106 data for transmission to each provider system 112 from database or other data source in a non-transitory computer-readable medium of the market facilitation system 102 at which the client profiles 106 are stored. Personal identification information can be omitted from the extracted profile data. The subset of data transmitted to each provider system 112 can include an identifier that the market facilitation system 102 can use to associate responses from the provider system 112 with a given client profile 106. The identifier can allow the market facilitation system 102 to maintain the anonymity of the client profile 106 with respect to the provider system 112. In some aspects, the identifier can be a field in the client profile 106 that uniquely identifies the client profile 106 to the market facilitation system without identifying the client profile 106 (e.g., a database record number or other alphanumeric value). In additional or alternative aspects, the identifier (e.g., an alphanumeric value) can be generated by the market facilitation system 102 and can be associated with each data transmission to a respective provider system 112. The identifier can be used by the facilitation application 108 to uniquely identify a client profile 106 and an associated request for a product or service information, but may not identify the holder of the client profile 106.

The process 700 can also involve receiving offers for a selected product or service from one or more provider systems 112, as depicted at block 710. A suitable processing device or group of processing devices of the market facilitation system 102 can execute the facilitation application 108 and thereby perform one or more operations for receiving offers for a selected product or service from one or more provider systems 112. For example, the market facilitation system 102 can receive one or more electronic communications from one or more provider systems 112 via a suitable data network.

The process 700 can also involve determining if a client is interested in one or more of the offers received from one or more provider systems 112, as depicted at block 714. For example, a suitable processing device or group of processing devices of the market facilitation system 102 can execute the facilitation application 108 and thereby perform one or more operations for determining if a client is interested in one or more of the offers. In some aspects, the facilitation application 108 can generate a web page including a graphical interface that includes the offers. The web page can be provided to the client system 110 via a suitable data network. The facilitation application 108 can receive information that is entered via the graphical interface that indicates whether the client is interested in one or more of the offers. In other aspects, the facilitation application 108 can transmit an electronic communication (e.g., an e-mail, a text message, a facsimile transmission, etc.) to the client system 110 or other communication device associated with the client that includes the offers. The facilitation application 108 can receive a responsive electronic communication from the client system 110 or other communication device that indicates whether the client is interested in one or more of the offers. Additionally or alternatively, the facilitation application 108 may determine that the client is not interested in one or more of the offers based on a specified amount of time elapsing after the electronic communication has elapsed.

If the facilitation application 108 determines at block 712 that the client is interested in one or more of the offers, the process 700 can also involve transmitting identification information for the client to one or more provider systems 112, as depicted at block 714. For example, a suitable processing device or group of processing devices of the market facilitation system 102 can execute the facilitation application 108 and thereby perform one or more operations for transmitting identification information for the client to one or more provider systems 112. The identification information can be provided via a secure communication over a suitable data network to one or more provider systems 112 that are associated with offers in which the client is interested. The identification information can be transmitted via any suitable electronic communication (e.g., web page, e-mail, etc.). In some aspects, the facilitation application 108 can solicit requests from the provider systems 112 to perform additional verification of data in the client profile 106, as depicted at block 716. In other aspects, block 716 can be omitted.

If the facilitation application 108 determines at block 712 that the client is not interested in one or more of the offers, the process 700 can terminate, as depicted at block 717.

Returning to block 706, if a required profile has not been established, the process 700 can also involve requesting additional information from the client system 110, as depicted at block 718. For example, a suitable processing device or group of processing devices of the market facilitation system 102 can execute the facilitation application 108 and thereby perform one or more operations for requesting the additional information. In some aspects, these operations can include identifying the data attributes used by the provider, identifying which of the identified data attributes are absent from the client profile 106, and providing a request to the client system 110 via a suitable data network. The request to the client system 110 provide via the data network may include (but is not limited to) one or more of presenting a web page that requests the additional information, transmitting an electronic communication to a client system 110 or other communication device that requests the additional information, etc. The process 700 can further also determining whether the client has provided additional information that is sufficient to establish the required profile, as depicted at block 720. The determination can be performed in a manner similar to that of block 706. If the client has provided additional information that is sufficient to establish the required profile, the process 700 can proceed to block 708. If the client has not provided additional information that is sufficient to establish the required profile, the process 700 can involve notifying the client system 110 that the request for the selected product or service cannot be process, as depicted at block 722.

Figure 8:
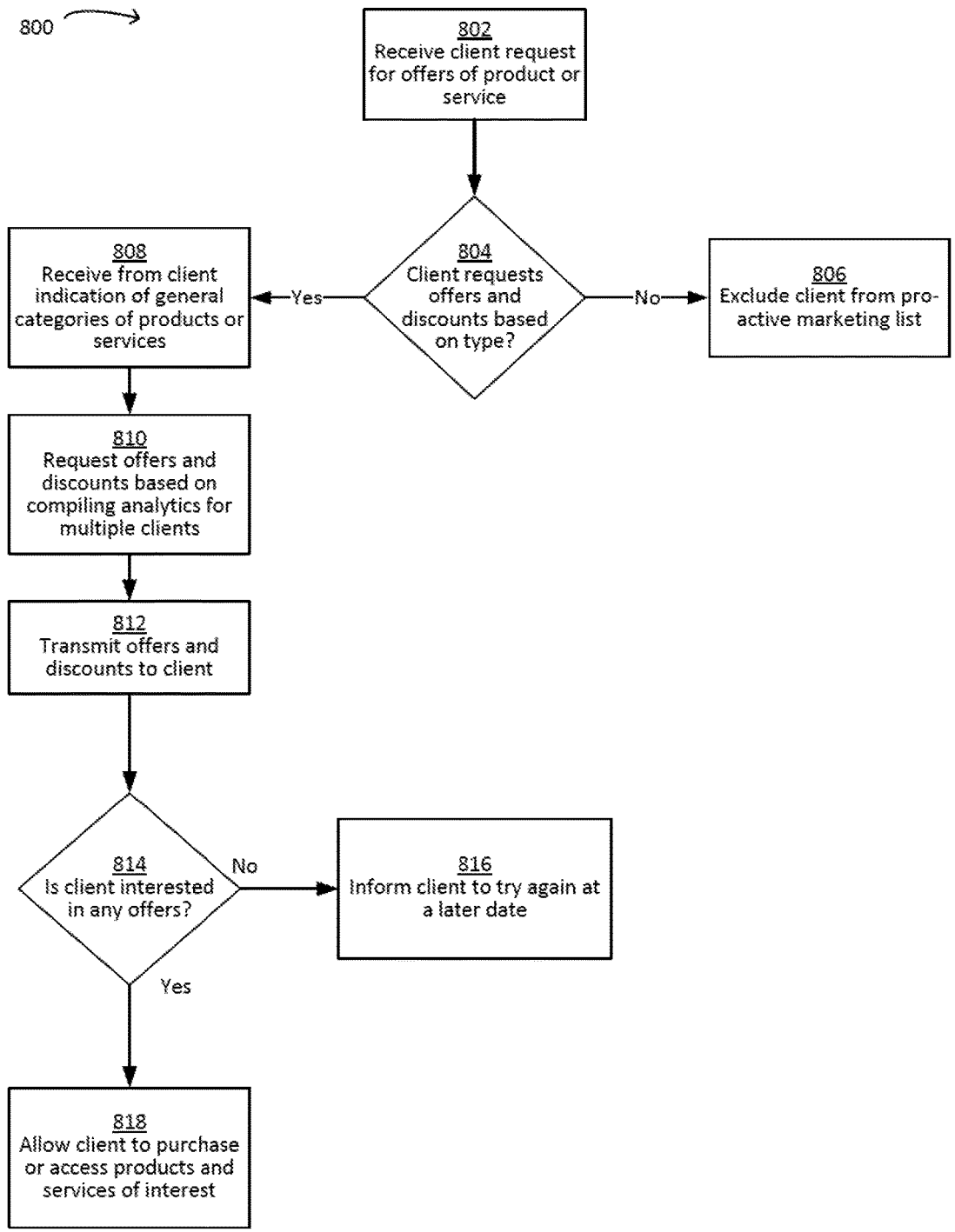
FIG. 8 is a flow chart illustrating an example of a process for using the market facilitation system of FIG. 1 to provide targeted offers and discounts about products or services to a client according to some aspects of the present disclosure.

FIG. 8 is a flow chart illustrating an example of a process 800 for using the market facilitation system 102 to provide targeted offers and discounts about products or services to a client according to some aspects. The process 800 can be executed by the market facilitation system 102 to provide targeted marketing and special offers to a client system 110 electronically over one or more networks. For illustrative purposes, the process 800 is described with respect to the implementations described above with respect to FIGS. 1-2. Other implementations, however, are possible.

The process 800 can involve receiving a client request for a product or service, as depicted at block 802. For example, a suitable processing device or group of processing devices of the market facilitation system 102 can execute the facilitation application 108 and thereby perform one or more operations for receiving a client request for a product or service over a data network from a client system 110. Non-limiting examples of such operations include operations with respect to receiving requests for products or services from a client system 110, as described above with respect to FIGS. 5-7.

The process 800 can also involve determining whether a client has requested special offers or other targeted marketing for the selected product or service, as depicted at block 804. For example, a suitable processing device or group of processing devices of the market facilitation system 102 can execute the facilitation application 108 and thereby perform one or more operations for which a client has requested special offers or other targeted marketing for the selected product or service. In some aspects, these operations can include determining whether a request for the product or service received from a client system 110 also includes data indicating that the client wishes to receive special offers or other targeted marketing from providers. In additional or alternative aspects, these operations can include determining whether the client profile 106 associated with the request for the product or service received from a client system 110 includes data indicating that the client wishes to receive special offers or other targeted marketing from providers.

If facilitation application 108 determines at block 804 that the client has not requested special offers or other targeted marketing for the selected product or service, the client profile 106 can be excluded from a proactive marketing list, as depicted at block 806. For example, a suitable processing device or group of processing devices of the market facilitation system 102 can execute the facilitation application 108 and thereby perform one or more operations for excluding the client profile 106 from a proactive marketing list.

If facilitation application 108 determines at block 804 that the client has requested special offers or other targeted marketing for the selected product or service, general indications of categories of products or services can be received from the client, as depicted at block 808. For example, a suitable processing device or group of processing devices of the market facilitation system 102 can execute the facilitation application 108 and thereby perform one or more operations for receiving general indications of categories of products or services, such as by receiving input via a web page presented to the client system 110 or receiving e-mail from the client system 110.

The process 800 can also involve requesting offers and discounts based on compiling analytical data for multiple clients from one or more provider systems 112, as depicted at block 810. For example, a suitable processing device or group of processing devices of the market facilitation system 102 can execute the facilitation application 108 and thereby perform one or more operations for requesting offers and discounts based on compiling analytical data for multiple clients.

The process 800 can also involve transmitting offers and discounts to the client system 110, as depicted at block 812. For example, a suitable processing device or group of processing devices of the market facilitation system 102 can execute the facilitation application 108 and thereby perform one or more operations for transmitting offers and discounts to the client system 110, such as by including the offers and discount in a web page provided to the client system 110 or sending electronic communication that include the offers and discounts to the client system 110.

The process 800 can also involve determining whether the client is interested in any of the offers, as depicted at block 814. For example, a suitable processing device or group of processing devices of the market facilitation system 102 can execute the facilitation application 108 and thereby perform one or more operations for determining whether the client is interested in any of the offers. These operations can include, for example, one or more of the operations described above with respect to block 712 in FIG. 7. If the client is interested in any of the offers, the process 800 can also involve allowing the client to purchase or otherwise access the products and services of interest, as depicted at block 818. For example, a suitable processing device or group of processing devices of the market facilitation system 102 can execute the facilitation application 108 and thereby perform one or more operations for allowing the client to purchase or otherwise access the products and services of interest. Non-limiting examples of such operations include the operations described above with respect to blocks 714 and 716 in FIG. 7. If the client is not interested in any of the offers, the process 800 can involve notifying the client to try again at a later date, as depicted at block 820. For example, a suitable processing device or group of processing devices of the market facilitation system 102 can execute the facilitation application 108 and thereby perform one or more operations for notifying the client to try again at a later date, such as by transmitting a web page or other electronic communication to the client system 110.

Figure 9:
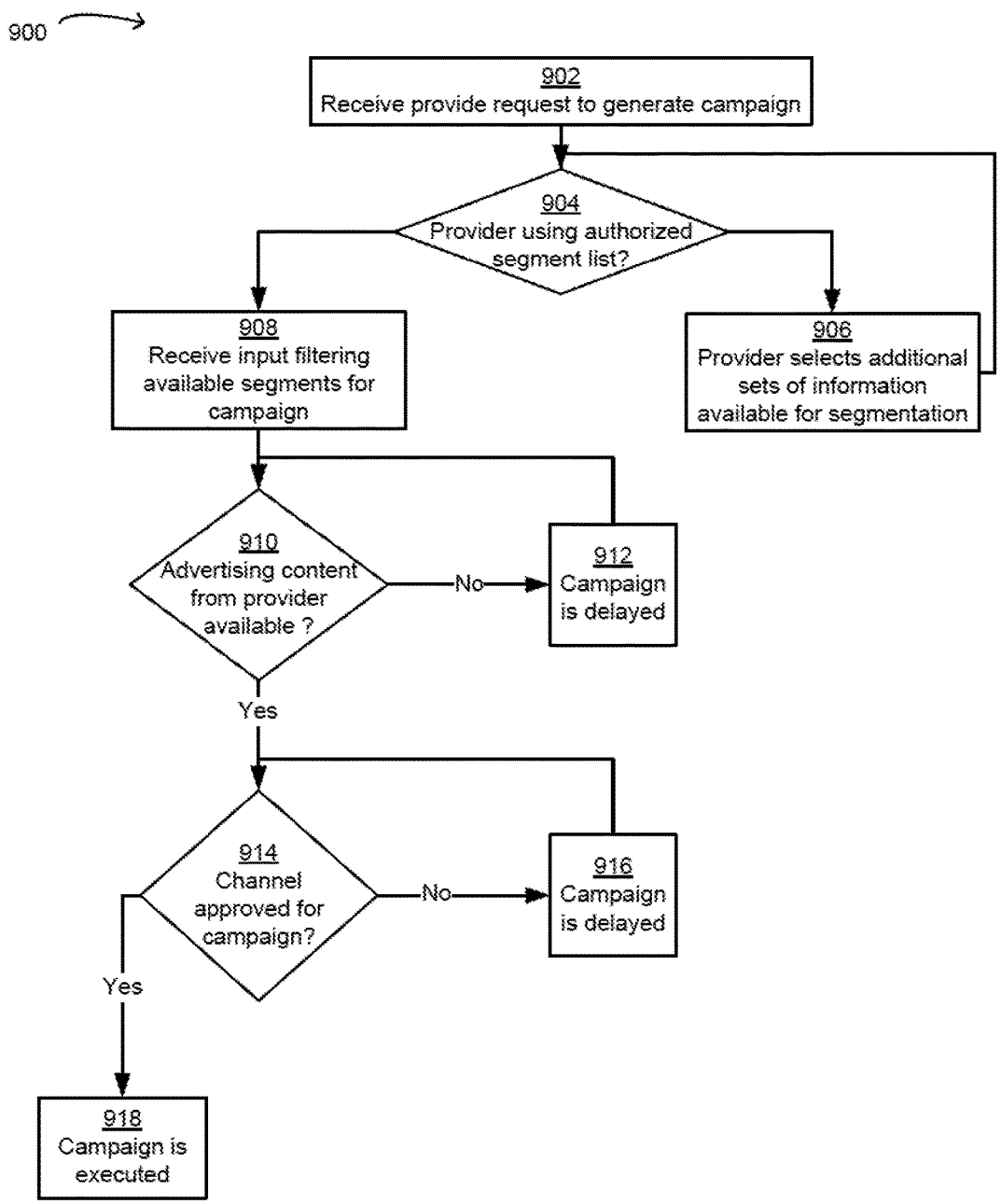
FIG. 9 is a flow chart illustrating an example of a process for using the market facilitation system of FIG. 1 to generate a marketing campaign according to some aspects of the present disclosure.

FIG. 9 is a flow chart illustrating an example of a process for using the market facilitation system 102 to generate a marketing campaign according to some aspects. The process 900 can be executed by the market facilitation system 102 in response to one or more inputs received over a data network from a provider system 112 to develop marketing campaigns. For illustrative purposes, the process 900 is described with respect to the implementations described above with respect to FIGS. 1-2. Other implementations, however, are possible.

The process 900 can involve receiving a request from a provider to generate a marketing campaign, as depicted at block 902. For example, a suitable processing device or group of processing devices of the market facilitation system 102 can execute the facilitation application 108 and thereby perform one or more operations for receiving a request from a provider to generate a marketing campaign. In some aspects, a web page that includes a graphical interface can be provided by the facilitation application 108 over a data network in response to the provider system 112 accessing a website hosted by or otherwise accessible to the market facilitation system 102. The graphical interface can receive inputs from the provider system 112 that define a provider's request to generate a marketing campaign. The inputs received from the provider system 112 via the graphical interface that define a provider's request to generate a marketing campaign can be received by the market facilitation system 102 over a data network. In other aspects, an electronic communication (e.g., an e-mail) can be received by the market facilitation system 102 from the provider system 112 via a suitable data network. The electronic communication can include data that defines a provider's request to generate a marketing campaign.

The process 900 can also involve determining whether the provider wishes to use an authorized segment list, as depicted at block 904. For example, a suitable processing device or group of processing devices of the market facilitation system 102 can execute the facilitation application 108 and thereby perform one or more operations for determining whether the provider wishes to use an authorized segment list. An authorized segment list may include a list of fields available to a provider to segment an anonymous target population for offers from the provider. The available fields may be based on information purchased by the provider from an operator of the market facilitation system 102. For example, one set of information may include reported details about financial profiles and the profiles of their respective cohorts, and another set of information may include verified employment segments that can allow the provider to target individuals with a particular job title.

If the provider does not wish to use an authorized segment list, the process 900 can involve the provider selecting additional sets of information about potential target populations of clients available for segmentation, as depicted at block 904. For example, a suitable processing device or group of processing devices of the market facilitation system 102 can execute the facilitation application 108 and thereby perform one or more operations that allow a provider system 112 to select additional sets of information that are available for segmentation. If the provider does not wish to utilize available sets of information and the provider possesses custom segmentation information sets, the provider can upload the custom information sets to the market facilitation system 102 via a suitable interface.

The process 900 can also involve receiving input that filters the available segments for the marketing campaign, as depicted at block 908. For example, a suitable processing device or group of processing devices of the market facilitation system 102 can execute the facilitation application 108 and thereby perform one or more operations for receiving input that filters the available segments for the marketing campaign. In some aspects, a web page that includes a graphical interface can be provided by the facilitation application 108 to the provider system 112 over a data network. The graphical interface can receive inputs from the provider system 112 that filters the available segments for the marketing campaign. The inputs received from the provider system 112 via the graphical interface that filter the available segments for the marketing campaign can be received by the market facilitation system 102 over a data network.

The process 900 can also involve determining whether advertising content for the provider is available, as depicted at block 910. For example, a suitable processing device or group of processing devices of the market facilitation system 102 can execute the facilitation application 108 and thereby perform one or more operations for determining if advertising content for the provider is available. In some aspects, determining whether advertising content for the provider is available can involve the facilitation application 108 accessing a non-transitory computer-readable medium of the market facilitation system 102 to determine if any stored advertising content from the provider is available for a marketing campaign. In additional or alternative aspects, determining whether advertising content for the provider is available can involve the facilitation application 108 requesting that the provider transmit advertising content for the marketing campaign to the market facilitation system 102. The request can be provided to a provider system 112 via any suitable electronic communication (e.g., a web page, an e-mail, etc.). The facilitation application 108 can subsequently determine whether the provider has responded to the request by uploading or otherwise providing the advertising content for the marketing campaign.

In some aspects, the facilitation application 108 can inject collateral or other advertising content to a communication channel based on preferences of clients as specified in client profiles 106. Placement of collateral or other advertising content can be determined in a batch process based on a rule engine determination executed on preference data. The facilitation application 108 can provide access to the rules engine by a provider system 112 through a suitable interface. The facilitation application 108 can additionally or alternatively allow collateral or other advertising content to be uploaded for distribution or other use during marketing campaigns.

If the advertising content for the provider is not available, the process 900 can involve delaying the advertising campaign, as depicted at block 912. For example, a suitable processing device or group of processing devices of the market facilitation system 102 can execute the facilitation application 108 and thereby perform one or more operations for determining if advertising content for the provider is available. These operations can involve generating or modifying a record for the marketing campaign in a non-transitory computer-readable medium of the market facilitation system 102. The record for the marketing campaign can identify that the marketing campaign is delayed and that the reason for the delay is an absence of advertising content for the delay. The process 900 can return to block 910.

If the advertising content for the provider is available, the process 900 can involve determining whether a communication channel is approved for the advertising campaign, as depicted at block 914. A suitable processing device or group of processing devices of the market facilitation system 102 can execute the facilitation application 108 and thereby perform one or more operations for determining whether a communication channel is approved for the advertising campaign. Non-limiting examples of communication channels include websites, e-mails or other electronic communications addressed to one or more clients, etc. In some aspects, determining whether a communication channel is approved for the advertising campaign can involve determining whether clients accessible via the communication channel have consented to be contacted via the communication channel. For example, the facilitation application 108 can access client profiles 106 in a non-transitory computer-readable medium of the market facilitation system 102 to determine if the clients associated with the client profiles 106 have consented to be contacted via the communication channel. In additional or alternative aspects, determining whether a communication channel is approved for the advertising campaign can involve determining whether a third party that manages the communication channel has approved the use of the channel for implementing the marketing campaign. For example, the facilitation application 108 can be used to communicate with one or more providers of websites hosted by or otherwise managed by entities other than the market facilitation system 102. Each provider of a respective website can transmit data over a suitable data network indicating whether the website provider has approved the use of the website for presenting advertising content of the marketing campaign.

If the communication channel is not approved for the advertising campaign, the process 900 can also involve delaying the marketing campaign, as depicted at block 916. For example, a suitable processing device or group of processing devices of the market facilitation system 102 can execute the facilitation application 108 and thereby perform one or more operations for delaying the marketing campaign. These operations can involve generating or modifying a record for the marketing campaign in a non-transitory computer-readable medium of the market facilitation system 102. The record for the marketing campaign can identify that the marketing campaign is delayed and that the reason for the delay is an absence of approval of one or more communication channels for providing the advertising content of the marketing campaign. The process 900 can return to block 914.

If the communication channel is approved for the advertising campaign, the process 900 can also involve executing the marketing campaign, as depicted at block 918. For example, a suitable processing device or group of processing devices of the market facilitation system 102 can execute the facilitation application 108 and thereby perform one or more operations for executing the marketing campaign. For example, the facilitation application 108 can transmit advertising content of the marketing campaign to one or more client via the approved communication channel.

In some aspects, sellers and other providers can access analytical information (both verified and unverified) from the market facilitation system 102 that is available for segmentation. In some aspects, the sellers and other providers can authorize the use of additional segments for new segmentations. In some aspects, advertising content to be presented to clients can be provided to the market facilitation system before a campaign can be scheduled for execution. A marketing campaign can be approved by a provider or other operator of a communication channel before advertising content associated with the marketing campaigns can be presented via the communication channel. In some aspects, channel providers may automatically approve requests from providers of products or services. Marketing campaigns that are deemed unacceptable may be cancelled by the provider. Additionally or alternatively, channel providers or operators may identify a reason that a given marketing campaign or its associated content is unacceptable. Providers can upload satisfactory content for review by the channel provider in response to reviewing the reason.

Figure 10:
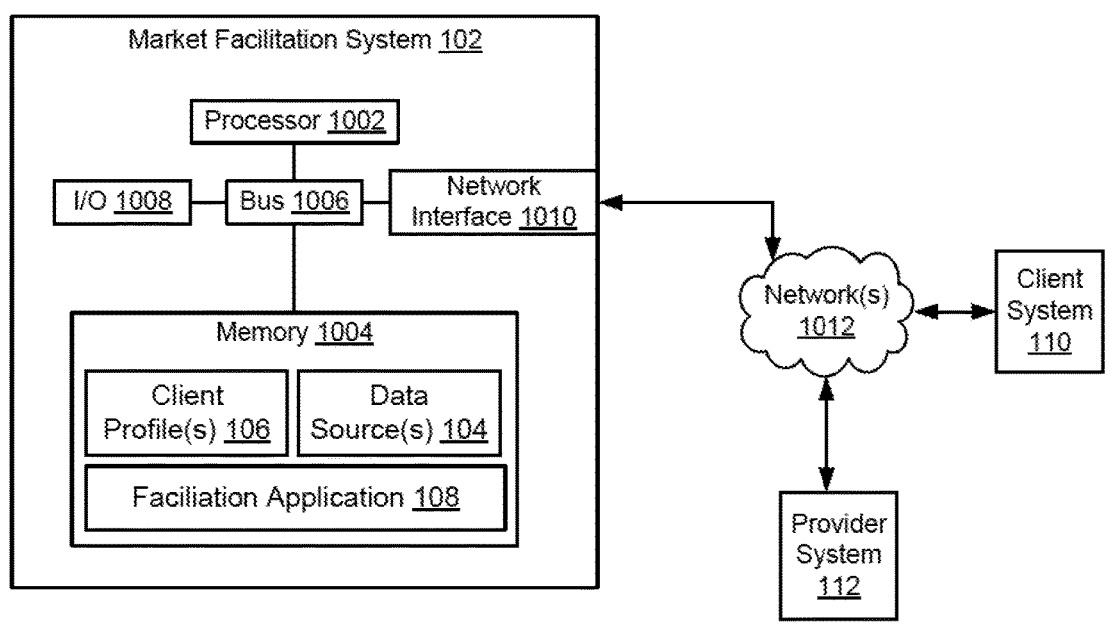
FIG. 10 is a block diagram depicting an example of a server system for implementing certain features according to some aspects of the present disclosure.

Any suitable computing system or group of computing systems can be used to implement the market facilitation system 102. For example, FIG. 10 is a block diagram depicting an example of a server system for implementing certain features according to some aspects.

The market facilitation system 102 can include a processor 1002 that is communicatively coupled to a memory 1004 and that executes computer-executable program instructions and/or accesses information stored in the memory 1004. The processor 1002 may comprise a microprocessor, an application-specific integrated circuit ("ASIC"), a state machine, or other processing device. The processor 1002 can include any of a number of processing devices, including one. Such a processor can include or may be in communication with a computer-readable medium storing instructions that, when executed by the processor 1002, cause the processor to perform the operations described herein.

The memory 1004 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The market facilitation system 102 may also include a number of external or internal devices such as input or output devices. For example, the market facilitation system 102 is shown with an input/output ("I/O") interface 1008 that can receive input from input devices or provide output to output devices. A bus 1006 can also be included in the market facilitation system 102. The bus 1006 can communicatively couple one or more components of the market facilitation system 102.

The market facilitation system 102 can execute program code for the facilitation application 108. The program code for the facilitation application 108 may be resident in any suitable computer-readable medium and may be executed on any suitable processing device. The program code for the facilitation application 108 can reside in the memory 1004 at the market facilitation system 102. The facilitation application 108 stored in the memory 1004 can configure the processor 1002 to perform the operations described herein.

The market facilitation system 102 can also include at least one network interface 1010. The network interface 1010 can include any device or group of devices suitable for establishing a wired or wireless data connection to one or more data networks 1012. Non-limiting examples of the network interface 1010 include an Ethernet network adapter, a modem, and/or the like.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A transaction facilitation system comprising:
   a processing device;
   a network interface device configured for communicatively coupling, via a data network, the transaction facilitation system to (i) a client computing device remote from the transaction facilitation system and (ii) provider computing devices that are remote from the transaction facilitation system and that are associated with providers of products or services; and
   one or more non-transitory computer-readable media communicatively coupled to the processing device and storing:
      a profile database storing profiles of consumers, wherein the profile database is inaccessible to the provider computing devices,
      a verified consumer information database storing consumer information that has been verified as accurate, wherein the verified consumer information database is inaccessible to the client computing device, and
      program instructions for facilitating transactions between the provider computing devices and verified, anonymous consumers via the data network,
   wherein the processing device is configured to execute the program instructions to perform operations comprising:
      receiving, via the data network and from the client computing device, client data describing consumer using the client computing device, the client data comprising attribute data of an attribute required by the provider computing devices for completing the transactions,
      verifying the client data by matching the attribute data to at least some of the information stored in the verified consumer information database,
      updating the profile data to include a client profile for the consumer, the client profile including (i) the client data, (ii) a tag indicating that the attribute data has been verified, (iii) a client type for the consumer, and (iii) a profile identifier lacking information about an identity of the consumer, the profile identifier usable by the processing device to retrieve the information about the identity from the verified consumer information database,
      matching the client profile to additional client profiles having the client type,
      generating, based on the additional client profiles, analytics data comprising predicted offer terms from the providers,
      transmitting, via the data network, the analytics data to the consumer computing device, wherein transmitting the analytics data maintains the anonymity of additional consumers respectively associated with the additional profiles,
      receiving, via the data network and from the client computing device, a request for offers from the providers,
      establishing, based on the request, secure communication channels with the provider computing devices over the data network, and
      transmitting, via the secure communication channels, a notification to the provider computing devices, wherein the notification is configured to facilitate one or more of the transactions while maintaining the anonymity of the consumer by (i) including the profile identifier and the attribute data and (ii) omitting the information about the identity of the consumer.

2. The transaction facilitation system of claim 1, wherein the received client data comprises personal identification information of the consumer and additional information about the consumer that does not include the personal identification information, wherein the processing device is configured to exclude the personal identification information from the notification.

3. The transaction facilitation system of claim 2, wherein the personal identification information comprises information that uniquely identifies the consumer.

4. The transaction facilitation system of claim 3, wherein the personal identification information comprises one or more of a name, a social security number, a residential address, and an electronic address.

5. The transaction facilitation system of claim 2, wherein the additional information includes the attribute data and the attribute data comprises one or more of demographic data of the consumer, an income level of the consumer, data describing assets possessed by the consumer, an educational level of the consumer, an employer of the consumer, a job title of the consumer, and an amount of time that the consumer has been employed with the employer.

6. The transaction facilitation system of claim 1, wherein the processing device is configured for generating the analytics data by performing operations comprising:
   identifying, for a product or service from the providers, a financial characteristic that varies based on the client profile;
   determining values of the financial characteristic that have been provided to the additional consumers associated with the additional client profiles; and providing, via the data network, the values of the financial characteristic in the analytics data.

7. The transaction facilitation system of claim 6, wherein the financial characteristic comprises a price attribute for the product or service that is determined based on the client profile and the values of the financial characteristic comprises price values for the product or service offered to the additional consumers.

8. The transaction facilitation system of claim 6, wherein the processing device is further configured for transmitting, via the data network, one or more suggestions to the client computing device for modifying one or more attribute of the client profile such that an offer value of the financial characteristic as offered to the consumer is similar to the values of the financial characteristic as offered to the additional consumers.

9. The transaction facilitation system of claim 1, wherein the processing device is further configured for:
identifying, from the request for offers, a description of at least one aspect of a product or service offered by the providers; and
determining that the product or service matches the identified description.

10. A method comprising:
receiving, by a transaction-facilitation computing system and from a client computing device, client data describing a consumer that uses the client computing device, the client data comprising attribute data of an attribute required by provider computing devices for completing the transactions, wherein the transaction-facilitation computing system is remote from the client computing device and the provider computing devices, wherein the transaction-facilitation computing system communicates with the client computing device and the provider computing devices via a data network;
verifying, by the transaction-facilitation computing system, the client data by matching the attribute data to at least some of the information stored in a verified consumer information database, wherein the verified consumer information database stores consumer information that has been verified as accurate and is inaccessible to the client computing device;
updating, by the transaction-facilitation computing system, a profile database to include profile data to include a client profile for the consumer, the client profile including (i) the client data, (ii) a tag indicating that the attribute data has been verified, (iii) a client type for the consumer, and (iv) a profile identifier lacking information about an identity of the consumer, the profile identifier usable by the transaction-facilitation computing system to retrieve the information about the identity from the verified consumer information database, wherein the profile database is inaccessible to the provider computing devices;
matching, by the transaction-facilitation computing system, the client profile to additional client profiles having the client type;
generating, by the transaction-facilitation computing system and based on the additional client profiles, analytics data comprising predicted offer terms for products or services from providers associated with the provider computing devices;
transmitting, via the data network, the analytics data from the transaction-facilitation computing system to the consumer computing device, wherein transmitting the analytics data maintains the anonymity of additional consumers respectively associated with the additional client profiles;
receiving, by the transaction-facilitation computing system and from the client computing device, a request for offers from the providers;
establishing, by the transaction-facilitation computing system and based on the request, secure communication channels with the provider computing devices over the data network; and
transmitting, via the secure communication channels, a notification from the transaction-facilitation computing system to the provider computing devices, wherein the notification facilitates one or more of the transactions while maintaining the anonymity of the consumer by (i) including the profile identifier and the attribute data and (ii) omitting the information about the identity of the consumer.

11. The method of claim 10, wherein the received client data comprises personal identification information of the consumer and additional information about the consumer that does not include the personal identification information,
wherein the transaction-facilitation computing system excludes the personal identification information from the notification.

12. The method of claim 11, wherein the personal identification information comprises information that uniquely identifies the consumer.

13. The method of claim 12, wherein the personal identification information comprises one or more of a name, a social security number, a residential address, and an electronic address.

14. The method of claim 11, wherein the additional information includes the attribute data and the attribute data comprises one or more of demographic data of the consumer, an income level of the consumer, data describing assets possessed by the consumer, an educational level of the consumer, an employer of the consumer, a job title of the consumer, and an amount of time that the consumer has been employed with the employer.

15. The method of claim 10, wherein the transaction-facilitation computing system generates the analytics data by performing operations comprising:
identifying, for a product or service from the providers, a financial characteristic that varies based on the client profile;
determining values of the financial characteristic that have been provided to the additional consumers associated with the additional client profiles; and
providing, via the data network, the values of the financial characteristic in the analytics data.

16. The method of claim 15, wherein the financial characteristic comprises a price attribute for the product or service that is determined based on the client profile and the values of the financial characteristic comprises price values for the product or service offered to the additional consumers.

17. The method of claim 15, further comprising transmitting, via the data network, one or more suggestions from the transaction-facilitation computing system to the client computing device for modifying one or more attribute of the client profile such that an offer value of the financial characteristic as offered to the consumer is similar to the values of the financial characteristic as offered to the additional consumers.

18. The method of claim 10, wherein further comprising:
identifying, from the request for offers, a description of at least one aspect of a product or service offered by the providers; and
determining that the product or service matches the identified description.

19. The transaction facilitation system of claim 1, wherein the processing device is further configured for:
adding an additional tag to the client profile indicating that that the attribute data is valid for a specified time period;
adding updated data to the verified consumer information database;
automatically determining, prior to transmitting the notification, that the specified time period has expired;
verifying the client data stored in the client profile by matching, subsequent to an expiration of the specified time period, the attribute data to at least some of the updated data stored in the verified consumer information database.

20. The transaction facilitation system of claim 19, wherein the processing device is further configured for:
establishing a separate secure communication channel with the client computing device, wherein the separate secure communication channel prevents data regarding the consumer from being transmitted to the provider computing systems;
receiving the client data and the request for offers via the separate secure communication channel;
receiving, responsive to the notification, responses from the provider computing devices that include the profile identifier and the offers; and
associating the responses with the information about the identity of the consumer based on a match between the profile identifier in the client profile and the received profile identifier in the responses.

* * * * *

UNITED STATES PATENT AND TRADEMARK OFFICE
CERTIFICATE OF CORRECTION

| | | |
|---|---|---|
| PATENT NO. | : 10,089,664 B2 | Page 1 of 1 |
| APPLICATION NO. | : 14/271690 | |
| DATED | : October 2, 2018 | |
| INVENTOR(S) | : Naser Hamdi et al. | |

It is certified that error appears in the above-identified patent and that said Letters Patent is hereby corrected as shown below:

In the Drawings

On sheet 1 of 7, in Figure 1, reference numeral 108, Line 1, delete "Faciliation" and insert -- Facilitation --, therefor.

On sheet 1 of 7, in Figure 2, reference numeral 108, Line 1, delete "Faciliation" and insert -- Facilitation --, therefor.

On sheet 7 of 7, in Figure 10, reference numeral 108, Line 1, delete "Faciliation" and insert -- Facilitation --, therefor.

In the Specification

In Column 4, Line 42, delete "un-verified," and insert -- unverified, --, therefor.

In Column 6, Line 4, delete "the a" and insert -- the --, therefor.

In the Claims

In Column 27, Line 63, in Claim 1, delete "describing" and insert -- describing a --, therefor.

In Column 31, Line 10, in Claim 19, delete "that that" and insert -- that --, therefor.

Signed and Sealed this
Twenty-ninth Day of January, 2019

Andrei Iancu
*Director of the United States Patent and Trademark Office*